(12) United States Patent
Akiyama et al.

(10) Patent No.: US 6,460,137 B1
(45) Date of Patent: *Oct. 1, 2002

(54) ENCRYPTION PROCESSING SYSTEM

(75) Inventors: Ryota Akiyama; Akio Munakata; Yuzuru Koga; Masayuki Ishizaki; Makoto Yoshioka, all of Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/617,596

(22) Filed: Mar. 19, 1996

(30) Foreign Application Priority Data

Jun. 2, 1995 (JP) .............................. 7-159771

(51) Int. Cl.[7] ................................. H04L 9/12
(52) U.S. Cl. ...................... 713/160; 380/262; 380/278; 713/162; 705/51
(58) Field of Search .............................. 380/21, 49, 45, 380/29, 37, 262, 202, 277, 278, 279, 283, 705, 51, 713, 160, 162; 713/160, 162; 705/51

(56) References Cited

U.S. PATENT DOCUMENTS

| | | | | |
|---|---|---|---|---|
| 4,405,829 A | * | 9/1983 | Rivest et al. | 380/30 |
| 4,731,843 A | * | 3/1988 | Holmquist | 380/29 |
| 4,757,536 A | * | 7/1988 | Szczutkowski et al. | 380/48 |
| 4,815,130 A | * | 3/1989 | Lee et al. | 380/50 |
| 5,247,575 A | * | 9/1993 | Sprague et al. | 380/9 |
| 5,319,705 A | * | 6/1994 | Halter et al. | 380/4 |
| 5,341,425 A | * | 8/1994 | Wasilewski et al. | 380/20 |
| 5,838,791 A | * | 11/1998 | Torii et al. | 380/217 |

OTHER PUBLICATIONS

Bruce Schneier, "Applied Cryptology: Protocols, Algorithms, and Source Code in C", 1st edition John Wiley and Sons, N.Y. (1992) pp. 160–167.*

Bruce Schneier, "Applied Cryptology: Protocols, Algorithms, and Source Code in C", 2nd edition John Wiley and Sons, N.Y. (1995) p. 194.*

Bruce Schneier, "Applied Cryptology: Protocols, Algorithms, and Source Code in C", 1st edition John Wiley and Sons, N.Y. (1992) pp. 160–161 (sec 8.1.4) and 165–167 (sec 8.2).*

* cited by examiner

Primary Examiner—Gilberto Barron, Jr.
Assistant Examiner—James Seal
(74) Attorney, Agent, or Firm—Staas & Halsey LLP

(57) ABSTRACT

A random-number generator generates first and second title keys on the basis of random numbers. A first DES encryption circuit for the title encrypts input data with the first title key. Initial values of this item of input data are a data identifier (ID) and program clock reference (PCR) that are extracted from a packet header. After completing the encryption of the initial values, a result of an encryption by a second DES encryption circuit for title serves as the input data for the first DES encryption circuit for title. The second DES encryption circuit for title encrypts a value of result of the encryption by the first DES encryption circuit for title with the second title key. An exclusive OR circuit outputs an exclusive OR of the data stored in the packet and a value of result of the encryption by the second DES encryption circuit for title. This exclusive OR turns out encrypted data.

11 Claims, 6 Drawing Sheets

ENCRYPTION PROCESSING SYSTEM

BACKGROUND OF THE INVENTION

1. Field of the Invention

The present invention relates to an encryption processing system used in a system (digital audio interactive system) for distributing software such as video authored works, etc. via a communication in response to a request from a client and intended to encrypt the software by specified keys.

2. Description of the Related Art

In recent years, there have been proposed services for distributing digitally software (which includes audio data, video data, etc. and is hereinafter referred to as "data") to individual houses, etc. against the background of architectures of a cable TV system and of a communication system using a communication satellite. This service system is a digital audio interactive system known as a video-on-demand system. In this digital audio interactive system, a service provider and a user communicate with each other via a telephone line or the like. Then, the service provider distributes, to a user, the data having a content requested by the user at a time designated by this user. At the same time, the service provider imposes a royalty on this set of data on the user through a credit card company or the like and returns a part of the royalty to a content provider.

What is important in terms of spreading the digital audio interactive system is that a server, a network and terminals be constructed as an infrastructure at low costs and that a great deal of data provided to the users through the infrastructure be prepared. That is, the data and the infrastructure function as the wheels of a making both indispensable to provide an environment wherein the data are easy to get transfer. For this purpose, the infrastructure has to incorporate a mechanism wherein the data provider can count on profits from providing the contents and there is no possibility of undergoing an unexpected damage due to providing the contents. Note that the above mechanism must be prepared irrespective of types (a broadband cable network, a satellite system, a mobile communication, an optical media package, etc.) of supply media intervening between the data providers and the users.

With such a standpoint, in a conventional system, the data have been encrypted during a distribution thereof so that the data are not intercepted and illegally used (reproduced) by a non-rightful third party (who does not pay the royalty of the data) during the distribution. An encryption processing method according to the conventional system will be explained with reference to FIG. 6.

Referring to FIG. 6, a first encryption circuit 103 in a service provider (which is defined as a system on the side of the service provider, and the following is the same as above) encrypts data in a packet format with only one key (Ks) and distributes the data to a service client (which is defined as a system on the user's side, and the following is the same as above) via a transport layer transmission path. A first decryption circuit 106 of the service client receiving this item of encrypted data decrypts the data with the key (Ks) used for the encryption in the first encryption circuit 103. Thus, algorithms for encrypting and decrypting the data in the conventional system are based on one-stage system using one-key (Ks) and therefore feeble. It is consequently required that the key (Ks) be frequently changed to prevent the key (Ks) from being decoded. It is also required that a cipher synchronous signal be transmitted for an immediate restoration from an error and a disconnection of the communication path.

In the conventional system, for satisfying this condition, as illustrated in FIG. 6, the service provider is equipped with a random-number generator 100, a master key (K1) 101 and a second encryption circuit 102, while the service client is equipped with a master key (K1) 104 and a second decryption circuit 105. This random-number generator 100 continuously generates a random-number sequence at all times. Then, this random-number sequence is clipped out at intervals of several seconds on a key block unit (a predetermined number of digits for the key) and inputted as a key (Ks) updated at the intervals of several seconds to the first encryption circuit 103. The thus updated key (Ks) must be distributed also to the service client, and, therefore, the second encryption circuit 102 encrypts the key (Ks) clipped out of the random-number generator 100 with the master key (K1) 101 and distributes the encrypted key to the service client by making use of a part (session layer) of a packet of the transport layer allocated to a user. The second decryption circuit 105 of the service client decrypts the encrypted key (Ks) by use of the master key (K1) and inputs the thus decrypted key to the first decryption circuit 106.

Then, the first encryption circuit 103 and the first decryption circuit 106 are reset themselves each time a new key (Ks) is inputted and thus take synchronism. These circuits 103, 106 then encrypt and decrypt the data thereafter by the new key (Ks). Note that the master keys (K1) 101, 104 are fixed keys previously prepared as the same data both in the service provider and in the service client. According to the conventional data encryption processing method, the change of key and the cipher synchronizing process are thus conducted.

In the conventional encryption processing system described since the new key (Ks) has to be distributed or provided from the service provider to the service client at the intervals of several seconds as a result, a large amount of packets for key distribution other than an addition to the packets used for the data distribution must be transmitted. As a result, there remarkably declines an data transfer efficiency between the service provider and the service client.

SUMMARY OF THE INVENTION

It is a first object of the present invention to provide an encryption processing system capable of reducing the necessity for frequently changing a key by enhancing an encryption algorithm and improving a data transfer efficiency between a service provider and a service client.

Further, it is a second object of the present invention to provide an encryption processing system capable of making it difficult to decode the data by converting the data having the same content into encrypted data having a different content depending on a generation time, wherein program clock reference in a packet header used for a data transfer is used as an initial value for the encryption.

According to a first aspect of the present invention, the above first object is accomplished between a service provider and a service client. More specifically, that is an encryption processing system for encrypting data distributed between a service provider for providing the data and a service client for receiving the data. This service provider comprises a key generating element for generating two keys on the basis of random numbers, a first encrypting element for encrypting the data with the two keys generated by the key generating element, a data distributing element for distributing the data encrypted by the first encrypting element to the service client, a second encrypting element for encrypting the two keys with master keys having specified contents and a key distributing element for distributing the two keys encrypted by the second encrypting element to the service client. On the other hand, the service client comprises a first decrypting element for decrypting the two encrypted keys distributed by the key distributing element with the master keys having the specified contents and a second decrypting element for decrypting the encrypted data distributed by the data distributing element with the two keys decrypted by the first decrypting element.

According to a second aspect of the present invention, the above first and second objects are accomplished on the side of the service provider. More specifically, that is an encryption processing system in a service provider for distributing data stored in a packet to a service client. This system comprises a key generating element for generating first and second keys on the basis of random numbers, a first encryption circuit encrypting input data with the first key, an extracting element extracting time information from a header of the packet and inputting this item of time information to the first encryption circuit as an initial value of the input data, a second encryption circuit encrypting a value of result of the encryption by the first encryption circuit with the second key and inputting a value of result of this encryption to the first encryption circuit as the input data and an exclusive OR circuit outputting an exclusive OR of the data stored in the packet and the value of result of the encryption by the second encryption circuit.

According to a third aspect of the present invention, the above first and second objects are accomplished between the service provider and the service client. More specifically, that is an encryption processing system for encrypting data distributed while being stored in a packet between a service provider for providing the data and a service client for receiving the data. This service provider comprises a key generating element for generating first and second keys on the basis of random numbers, a key distributing element for distributing the first and second keys to the service client, a first encryption circuit encrypting input data with the first key, a first extracting element for extracting time information from a header of the packet and inputting this item of time information to the first encryption circuit as initial values of the input data, a second encryption circuit encrypting a value of result of the encryption by the first encryption circuit with the second key and inputting a value of result of this encryption to the first encryption circuit as the input data, a first exclusive OR circuit outputting an exclusive OR of the data stored in the packet and the value of result of the encryption by the second encryption circuit and a data distributing element for distributing the packet stored with the data outputted from the exclusive OR circuit to the service client. On the other hand, the service client comprises a third encryption circuit encrypting the input data with the first key distributed by the key distributing element, a second extracting element for extracting the time information from the header of the packet and inputting this item of time information to the third encryption circuit as initial values of the input data, a fourth encryption circuit encrypting a value of result of the encryption by the third encryption circuit with the second key distributed by the key distributing element and inputting a value of result of this encryption to the third encryption circuit as the input data and a second exclusive OR circuit outputting an exclusive OR of the data stored in the packet and a value of result of the encryption by the fourth encryption circuit.

According to the first aspect of the present invention, in the service provider, the key generating element generates the two keys on the basis of the random numbers. The first encrypting element executes a predetermined encryption algorithm on input data on the basis of the two keys generated by this key generating element, thereby encrypting the data. Further, the second encrypting element encrypts these two keys with the master keys having specified contents. After the above processes, the data distributing element distributes the data encrypted by the first encrypting element to the service client, and the key distributing element distributes the two keys encrypted by the second encrypting element to the service client. On the other hand, in the service client, the first decrypting element decrypts the two encrypted keys distributed by the key distributing element by use of the master keys having the specified contents. The second decrypting element executes the decryption algorithm corresponding to the above encryption algorithm on the encrypted data distributed by the distributing element on the basis of the two keys decrypted by the first decrypting element, thereby decrypting the encrypted data. Thus, the encryption is carried out by use of the two keys, and a degree of the encryption is thereby enforced.

According to the second aspect of the present invention, the key generating element generates the first and second keys on the basis of the random numbers. The first encryption circuit encrypts the input data with the first key. Initial values of this item of input data are time information extracted by the extracting element from the header of the packet. After completing the encryption of the initial values, a result of the encryption by the second encryption circuit turns out the input data for the first encryption circuit. This second encryption circuit encrypts a value of result of the encryption by the first encryption circuit with the second key. The exclusive OR circuit outputs an exclusive OR of the data stored in the packet and the value of result of the encryption by the second encryption circuit. Thus, in this encryption processing system, the first and second keys and the time information are employed for the encryption. The degree of the encryption is therefore enhanced, correspondingly. Besides, since the time information is used, even if the first and second keys are fixed for a short while, the data with the same contents can be converted into the encrypted data with different contents, and hence the third part correspondingly becomes harder to decode.

According to the second aspect of the present invention, the packet may contain the storage position information about the storage positions of the data stored in the packet, and the system may further comprise an encryption control circuit performing the control to enable the first and second encryption circuits to encrypt only when the data are inputted to the exclusive OR circuit on the basis of this item of storage position data. If done in this way, the data exclusive of the data storage part of the packet may remain intactly in the form of the plain text. Accordingly, the service client is capable of reading the time information from this plain text and decrypting the data.

According to the second aspect of the present invention, the system further comprises an initializing element for initializing the statuses of the first and second encryption circuits by detecting the time information from the packet. If done in this way, the service client is capable of autonomically taking the encryption synchronism by detecting this item of time information without taking trouble to transmit a special synchronous signal to the service client.

According to the third aspect of the present invention, in the service provider, the key generating element generates the first and second keys on the basis of the random numbers. The key distributing element distributes the first and second keys to the service client. Further, the first encryption circuit encrypts the input data with the first key. Initial values of this item of input data are time information extracted by the first extracting element from the header of the packet. After completing the encryption of the initial values, a result of the encryption by the second encryption circuit turns out the input data for the first encryption circuit. This second encryption circuit encrypts a value of result of the encryption by the first encryption circuit with the second key. The first exclusive OR circuit outputs an exclusive OR of the data stored in the packet and the value of result of the encryption by the second encryption circuit. The distributing element distributes the packet stored with the thus encrypted data to the service client.

On the other hand, in the service client, the third encryption circuit encrypts the input data with the first key distributed by the key distributing element. Initial values of this item of input data are time information extracted by the second extracting element from the header of the packet. After completing the encryption of the initial values, a result of the encryption by the fourth encryption circuit turns out to be the input data for the third encyption circuit. This fourth encryption circuit encrypts a value of result of the encryption by the third encryption circuit. The second exclusive OR circuit outputs an exclusive OR of the data stored in the packet and the value of result of the encryption by the fourth encryption circuit. Thus, in this encryption processing system, the first and second keys and the time information are used for the encryption. Therefore, the degree of the encryption is enhanced, correspondingly. Besides, since the time information are employed, even when the first and second keys are fixed for a short while, the data having the same contents can be converted into the encrypted data having different contents, and, therefore, the third party correspondingly becomes harder to decode.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DESCRIPTION OF THE PREFERRED EMBODIMENT

The present invention will hereinafter be described by way of one embodiment with reference to the accompanying drawings. In accordance with this embodiment, an encryption processing system according to the present invention is applied to a digital audio interactive system.

Principle of Embodiment

Figure 1:
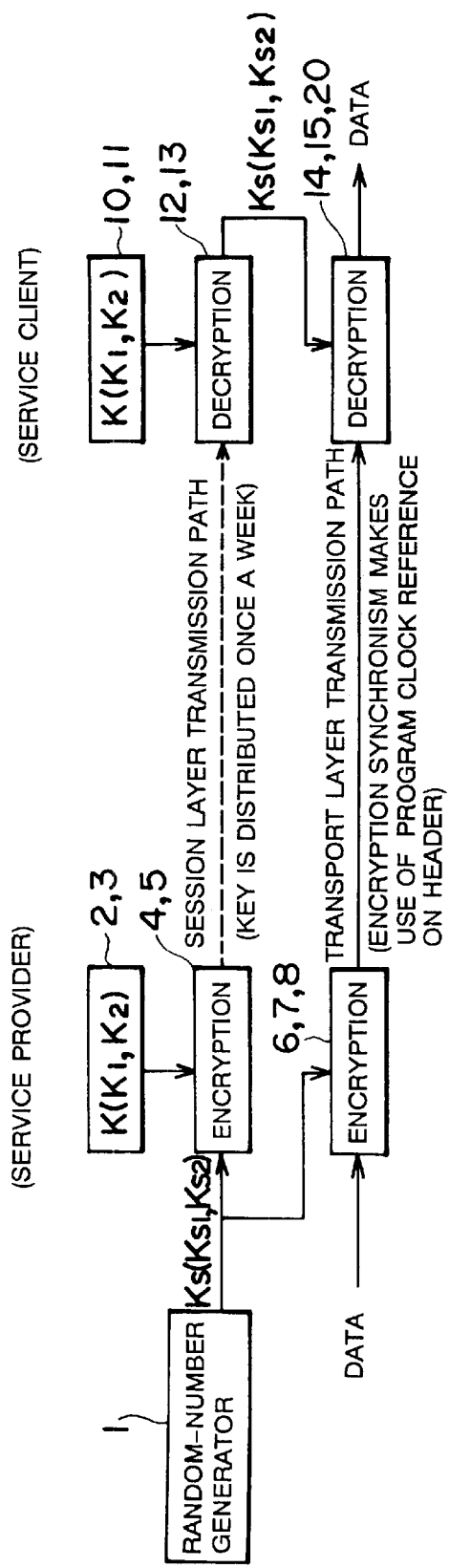
FIG. 1 is a block diagram illustrating a principle of an embodiment of the present invention.

Referring to FIG. 1, a principle of this embodiment will be explained. A random-number generator 1 of a service provider generates a first title key Ks1 and a second title key Ks2 on the basis of random numbers. Data inputted to the service provider are encrypted with the first and second title keys Ks1, Ks2 and transmitted via a transport layer transmission path to a service client. On the other hand, in the service provider, the first and second title keys Ks1, Ks2 are encrypted by a first master key K12 and a second master key K23 and transmitted via a session layer transmission path to the service client. In the service client, the thus encrypted first and second title keys Ks1, Ks2 are decrypted by a first master key K1 and a second master key K2 which is the same as those in the service provider and then used for decrypting the encrypted data.

Construction of Embodiment (Structure of Software)

Figure 3:
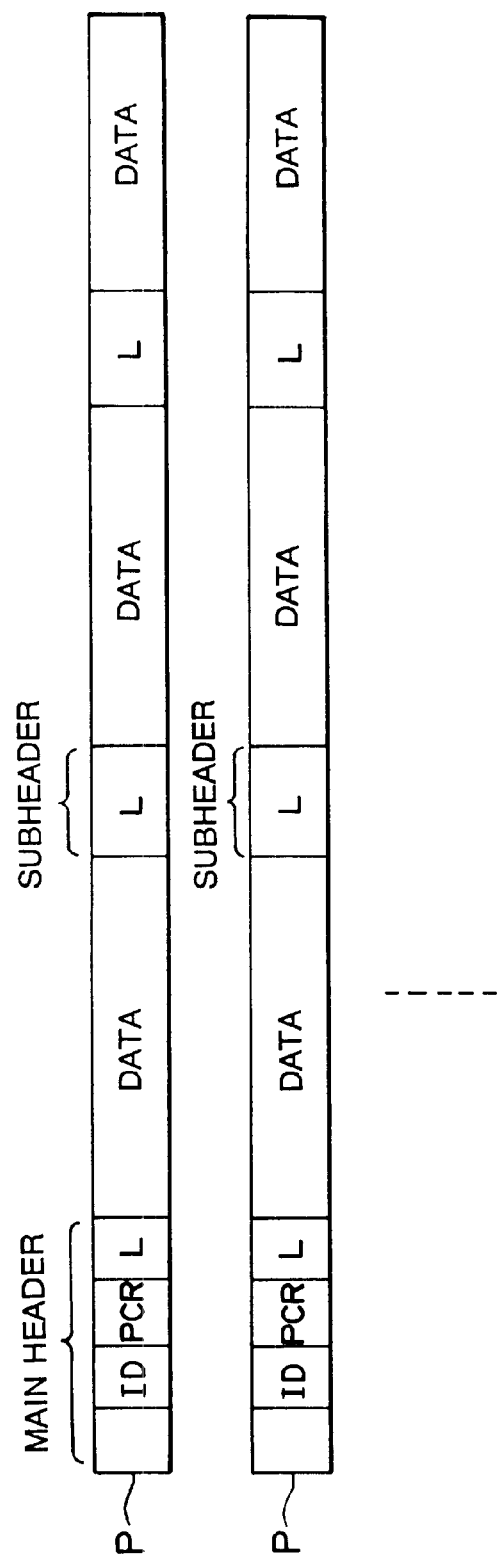
FIG. 3 is an explanatory diagram showing a structure of each transport packet stored with data constituting a set of software.

At first, FIG. 3 illustrates a structure of the software distributed through the digital audio interactive system in accordance with this embodiment. As illustrated in FIG. 3, a set of software is divided into a plurality of segments, which are stored respectively in separated transport packets P. This transport packet is prescribed by MPEG.

Affixed to a head of each transport packet P is a main header for indicating a status of the data stored in each transport packet P. This main header contains various items of data such as a data identifier (ID), program clock reference (PCR) and data length information (L). The data identifier (ID) is an identifier for indicating that the data constituting a certain set of software are stored. Accordingly, the same identifiers ID are affixed to all the transport packets P stored with the data constituting the same software. Further, the program clock reference (PCR) is data for indicating a generation time of each transport packet P. That is, the program clock reference (PCR) is affixed to each packet P generated based on the data sequentially clipped out of the original software while being updated each time the packet P is generated. Accordingly, if the data stored in the respective transport packets P having the same data identifiers (ID) are arranged in the sequence of these pieces of program clock reference (PCR), the original software can be reorganized. Further, the data length information (L) serving as storage position information is data for indicating a length of the data posterior to this main header.

In each of the transport packets P, data and subheaders are alternately linked to each other subsequent to the main header. Respective pieces of data are 1-frame video and audio data compressed based on the MPEG standards. Further, each subheader is stored with the data length information (L) for indicating the length of the data subsequent thereto.

(System Architecture)

Figure 2:
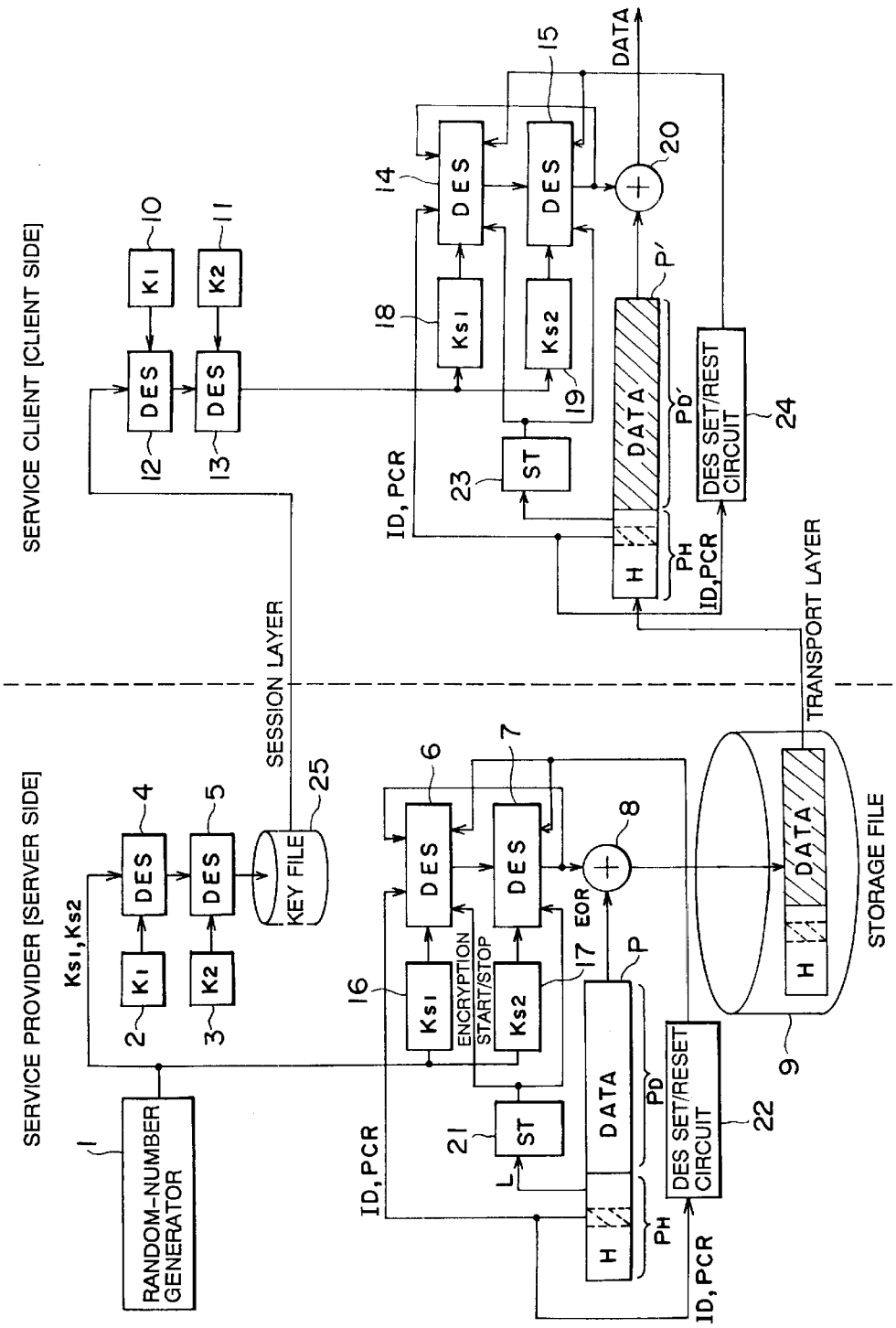
FIG. 2 is a block diagram schematically showing a digital audio interactive system to which an encryption processing system in accordance with the embodiment is applied.

Next, FIG. 2 illustrates an outline of the digital audio interactive system in this embodiment. This digital audio interactive system comprises the service provider for storing a multiplicity of sets of software and distributing the software in response to a request given from the client. The digital audio interactive system further comprises a multiplicity of service clients for receiving the distributed software and playing back the software. The architecture of the digital audio interactive system in this embodiment is designed to utilize the data identifier (ID) and the clock reference (PCR) for the encryption and to create encryption texts having different contents depending on if the same plain text data (which implies not-yet-encrypted data, and the following is the same as above) are encrypted. Hereinbelow, the architecture thereof will be discussed in greater detail on the basis of each of the service provider and the service client.

(Service Provider)

In the service provider, the random-number generator 1 generates a random-number sequence once a week for every title of each set of software. This random-number sequence has a length for two key block units (the number of digits predetermined for the encryption key) and is inputted to a first key buffer 16, a second key buffer 17 and a first DES (Data Encryption Standard) encryption circuit for key 4.

The first key buffer 16 serving as a key generating element clips a head key block unit out of this random-number sequence as the first title key (Ks1) and holds this first title key (Ks1) till the random-number sequence of the next time is inputted.

Similarly, the second key buffer 17 serving as a key generating element clips a second key block unit out of this random-number sequence as the second title key (Ks2) and holds this second title key (Ks2) till the random-number sequence of the next time is inputted.

The first DES encryption circuit for key 4 encrypts the random-number sequence composed of the first title key (Ks1) and the second title key (Ks2) by use of the first master key (K1). The thus encrypted random-number sequence is transferred to the second DES encryption circuit for key 5 and further encrypted by use of the second master key (K23).

The thus double-encrypted random-number sequence is temporarily stored in a key file 25 as title keys for specified titles. The encrypted random-number sequence stored in this key file 25 is, when a new random-number sequence as a new title key for the titles is generated after a week, updated by this new random-number sequence.

On the other hand, the software with each title is encrypted by the new title keys (Ks1, Ks2) once a week in accordance with an event that the random-number sequence is generated from the random-number generator 1 and then stored in a storage file 9. That is, the software with a certain title stored in the storage file 9 is updated once a week. For carrying out this update, a group of the transport packets P having the same data identifiers (ID) that are stored with the plain text data undergo processing in the order of the program clock reference (PCR).

The data identifier (ID) and the program clock reference (PCR) are extracted from the main header of each individual transport packet P and inputted to a first DES encryption circuit for title 6 and a DES set/reset circuit 22 (corresponding to an extracting element). Simultaneously therewith, the data length information (L) is extracted out of the main header and inputted to a data strobe signal detector 21. Note that the data length information (L) is extracted also from the subheader of the individual transport packet P and inputted to the data strobe signal detector (ST) 21. The transport packet P from which various items of information have been thus extracted is inputted to one input terminal of an exclusive OR circuit 8 in sequence from the side of the main header.

The DES set/reset circuit 22 serving as an initializing element, upon detecting the data identifier (ID) and the program clock reference (PCR) from the inputted data, recognizes that the processing for the new transport packet P is started. Then, the DES set/reset circuit 22 resets the first title DES encryption circuit for title 6 and a second title DES encryption circuit for title 7, thereby initializing internal statuses thereof. As a result, in this embodiment, it follows that cipher synchronism is taken at the head of each transport packet P. That is, each time the data identifier (ID) and the program clock reference (PCR) are inputted after the new transport packet P has been inputted, the two DES encryption circuits for title 6, 7 are initialized, and it follows that the encryption resumes with this data identifier (ID) and the program clock reference (PCR) serving as initial values.

The first DES encryption circuit for title 6 as a first encryption circuit encrypts the input data by use of the first title key (Ks1) held in the first key buffer 16. The first DES encryption circuit for title 6 executes the encryption with the data identifier (ID) and the program clock reference (PCR) serving as the initial values in the initial status after being reset and thereafter encrypts the data fed back from the second DES encryption circuit for title 7 till it is reset once again.

The second DES encryption circuit for title 7 as a second encryption circuit further encrypts the input data from the first DES encryption circuit for title 6 by use of the second title key (Ks2) held in the second key buffer 17. An output of the second DES encryption circuit for title 7 is fed back to the input terminal of the first DES encryption circuit for title 6 and also inputted to the other input terminal of the exclusive OR circuit 8. This feedback is repeated till the respective DES encryption circuits for title 6, 7 are reset by the DES set/reset circuit 22.

The data strobe signal detector (ST) 21 serving as an encryption control circuit, for the purpose of encrypting only the intra transport packet data, extracts the data length information (L) from the main header of each transport packet P and outputs control signals, i.e., data strobe signals for starting and stopping the encryption by the DES encryption circuits for title 6, 7 on the basis of this item of data length information (L). That is, the data strobe signals are pulses for starting the encryption by the DES encryption circuits for title 6, 7 at timings when the head parts of respective items of data in each transport packet P are inputted to the exclusive OR circuit 8 and for stopping the encryption by the DES encryption circuits for title 6, 7 at timings when tail parts of respective items of data pass through the exclusive OR circuit 8. Note that the second DES encryption circuit for title 7 continues to output "O" while the encryption is stopped by the data strobe signal.

The exclusive OR circuit 8 outputs an exclusive OR of the content of the transport packet P of the plain text and the encrypted data from the second DES encryption circuit for title 7. That is, the exclusive OR circuit 8, when the header part (main header and subheader) in each transport packet P is inputted, outputs the content of this header intactly in the form of the plain text because of the two DES encryption circuits for title 6, 7 performing no encryption. Further, when the data part in each transport packet P is inputted, the two DES encryption circuits for title 6, 7 effect the encryption, and hence a logical value of the input data is inverted according to the encrypted data from the second DES encryption circuit for title 7 and then outputted.

In this way, the encrypted data added with the header (main header and subheader) of the plain text is created and stored in the storage file 9. When the transport packet P including the next program clock reference (PCR) having the same data identifier becomes a target to be processed, the two DES encryption circuits for title 6, 7 are reset, and a new encryption is executed, wherein the data identifier and the program clock reference (PCR) of the transport packet P serve as initial values. Thus, all the items of encrypted data constituting a certain title are stored in the storage file 9. At this time, in the case that the encrypted data concerning to the software having the same title have already been stored in the storage file 9, old items of encrypted data are updated with new items of encrypted data.

The encrypted data (transport packet P) stored in the storage file 9 in this manner are read from the storage file 9 in the order of the program clock reference (PCR) in response to a request from one of the service client. and distributed to the requesting service client via the transport layer transmission path serving as a data distributing element. At this time, the encrypted random-number sequence corresponding to the title of the encrypted data (transport packet P) to be distributed is also read from the key file 25. The thus read encrypted random-number sequence is then distributed to the service client by making use of a part of the packet of the transport layer allocation to a user (that is, a session layer transmission path as a key distributing element).

(Service Client)

In the service client, the encrypted random-number sequence received via the session layer transmission path is inputted to a first DES decryption circuit for key 12. This first DES decryption circuit for key 12 performs a decryption by executing an algorithm absolutely reversal to that of the first DES encryption circuit for key 4 by making use of the first master key (K1) 10. Note that this first master key (K1) 10 is a fixed key having absolutely the same content as that on the side of the service provider.

An output of the first DES decryption circuit for key 12 is inputted to a second DES decryption circuit for key 13. This second DES decryption circuit for key 13 effects the decryption by executing an algorithm absolutely reversal to that of the second DES encryption circuit for key 5. It is to be noted that this second master key (K2) 11 is a fixed key having absolutely the same content as that on the side of the service provider.

The output of the second DES decryption circuit for key 13, which has gone through the 2-stage decryption processes, is a random-number sequence itself generated from the random-number generator 1. This random-number sequence is inputted to a first key buffer 18 and a second key buffer 19, respectively.

The first key buffer 18 clips a head key block unit out of this random-number sequence and uses it as a first title key (Ks1). The first key buffer 18 then holds this first title key (Ks1) till a random-number sequence of the next time is inputted.

Similarly, the second key buffer 19 clips a second key block unit out of this random-number sequence and uses it as a second title key (Ks2). The second key buffer 19 then holds this second title key (Ks2) till a random-number sequence of the next time is inputted.

On the other hand, the transport packets P received via the transport layer are sequentially inputted to an exclusive OR circuit 20. Before being inputted to this exclusive OR circuit 20, the data identifier (ID) and the program clock reference (PCR) are previously extracted from the main header of each transport packet P and inputted to a first DES decryption circuit for title 14 and a DES set/reset circuit 24 (corresponding to a second extracting element). Simultaneously therewith, the data length information (L) is extracted from the main header and inputted to a data strobe signal detector 23. Note that the data length data (L) is extracted also from the subheader of each individual transport packet P and inputted to the data strobe signal detector (ST) 23.

The DES set/reset circuit 24, on detecting the data identifier (ID) and the program clock reference (PCR) from the inputted data, recognizes that the processing for the new transport packet P is started and initializes internal statuses of the first DES encryption circuit for title 14 and a second DES encryption circuit for title 15 by resetting these circuits 14, 15. Note that in this embodiment, as discussed above, the cipher synchronism is taken at the head of each transport packet. Accordingly, even if there is an error and a disconnection of the communication path, in the service client, the two DES encryption circuits for title 14, 15 are reset when the head of the next transport packet P is detected, whereby it autonomically reverts to a synchronous status.

The first DES encryption circuit for title 14 serving as a third encryption circuit encrypts the inputted data on the basis of the same algorithm as that of the first DES encryption circuit for title 6 of the service provider by use of the first title key (Ks1) held in the first key buffer 18. The first DES encryption circuit for title 14, encrypts the data with the data identifier (ID) and the program clock reference (PCR) serving as initial values in the initial status after being reset and thereafter encrypts the data fed back from the second DES encryption circuit for title 15 till it is again reset.

The second DES encryption circuit for title 15 serving as a fourth encryption circuit further encrypts the inputted data from the first DES encryption circuit for title 14 on the basis of the same algorithm as that of the second DES encryption circuit for title 7 of the service provider by use of the second title key (Ks2) held in the second key buffer 19. An output of the second DES encryption circuit for title 15 is fed back to an input terminal of the first DES encryption circuit for title 14 and also inputted to the other input terminal of an exclusive OR circuit 20. This feedback is repeated till the DES set/reset circuit 24 resets the respective DES encryption circuits for title 14, 15.

The data strobe signal detector (ST) 23 extracts the data length information (L) from the main header of each transport packet P and outputs the control signals, i.e., the data strobe signals for starting and stopping the encryption by the respective DES encryption circuits for title 14, 15 on the basis of this item of data length information (L) to make the circuits 14, 15 effect the decrypting process only on the data within the transport packet P. That is, the data strobe signals are pulses for causing the DES encryption circuits for title 14, 15 to perform the encryption only when the encrypted data parts in the respective transport packets P are inputted to the exclusive OR circuit 20. Note that the second title DES encryption circuit 15 continues to output "O" during a halt of the encryption by dint of the data strobe signals.

As discussed above, the circuits posterior to the first key buffer 18 and the second key buffer 19 in the service client are absolutely the same as those in the service provider. Hence, the encrypted data inputted from the second DES encryption circuit for title 15 to the exclusive OR circuit 20 is also absolutely the same as the encrypted data inputted from the second DES encryption circuit for title 7 to the exclusive OR circuit 8 in the service provider. Therefore, the exclusive OR circuit 20, when the header part (main header and subheader) within each transport packet P is inputted, outputs the content of this header intactly in the form of the plain text. Further, the exclusive OR circuit 20, when the data part within each transport packet P is inputted, inverts a logic value in accordance with the encrypted data given from the second title DES encryption circuit 15 and then outputs the inverted logic value. This item of encrypted data is data where the logic value thereof was inverted beforehand. Hence, a re-inversion in the exclusive OR circuit 20 makes the logical value thereof revert to the original status, whereby the data of the plain text before the encryption can be restored.

Operation of Embodiment

As described above, in accordance with this embodiment, both on the service provider's side and on the service client's side, the DES encryption circuit for title is dualized. Accordingly, since the encryption algorithm is enhanced, it is still more difficult for the third party (including user) to decrypt the encrypted data by decoding the two title keys on the basis of the transport packet P. This will be explained with reference to FIGS. 4 and 5.

Figure 4:
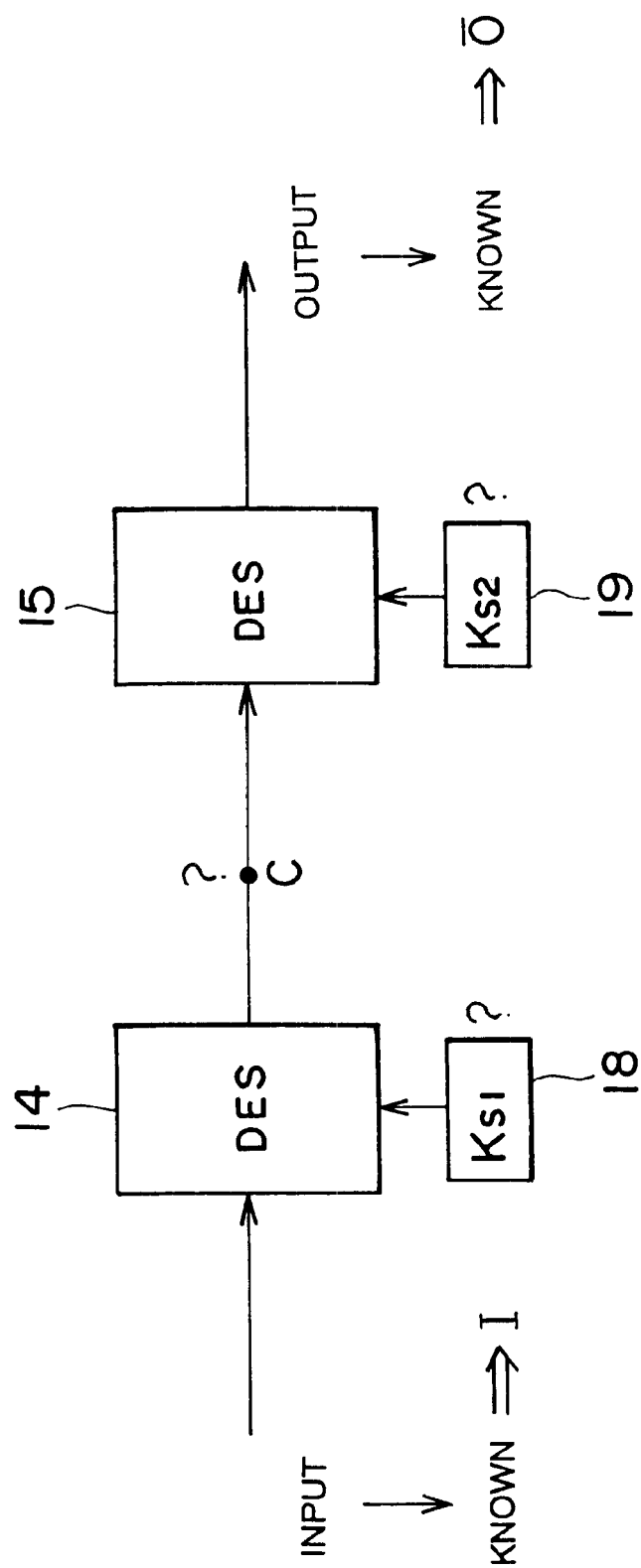
FIG. 4 is an explanatory diagram illustrating a brute force key attack based on an meet in the middle attack
Figure 5:
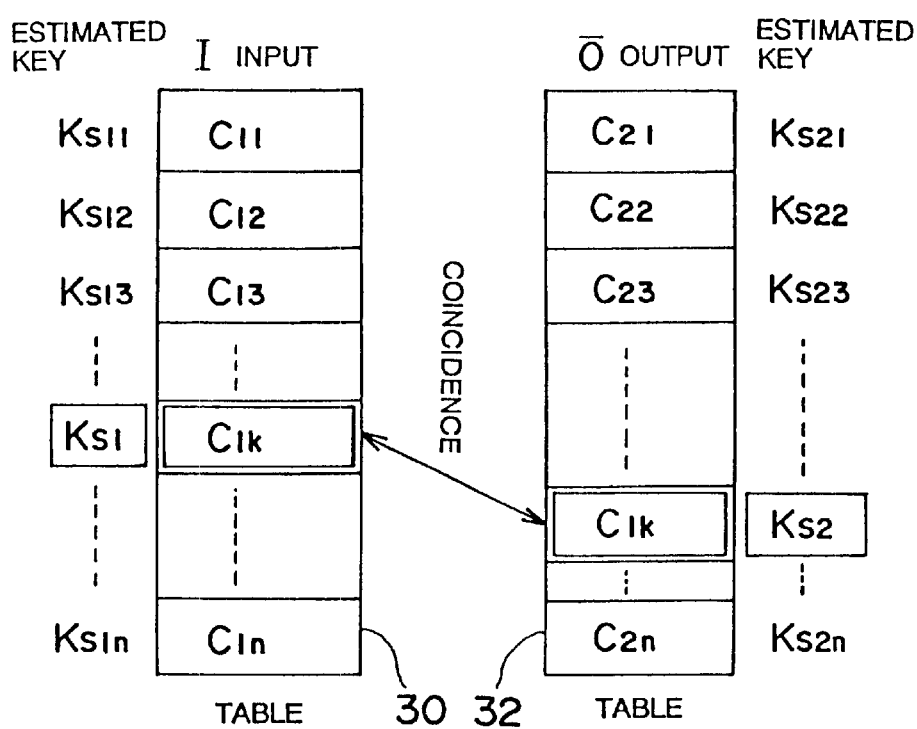
FIG. 5 is an explanatory diagram illustrating the brute force key attack based on the meet in the middle attack.
Figure 6:
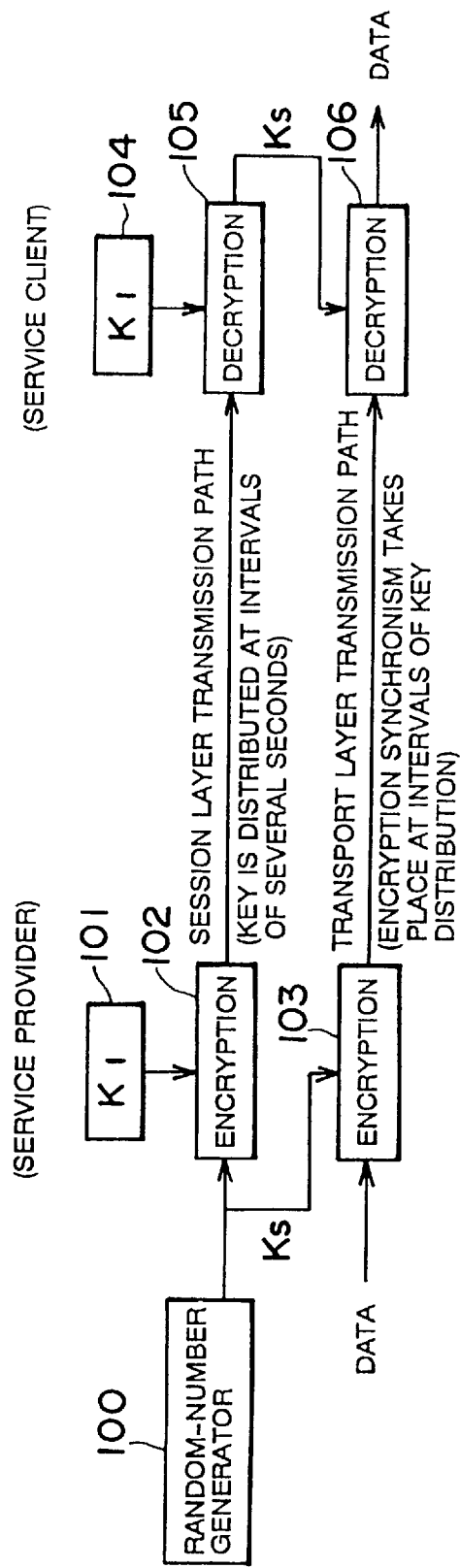
FIG. 6 is an explanatory diagram schematically showing a conventional encryption processing system.

Now, it is assumed that a value "1" is inputted to the first DES encryption circuit for title 14, and a value "0" is outputted from the output terminal of the second DES encryption circuit for title 15. In this case, for decoding the title keys Ks1, Ks2 held in the first and second key buffers 18, 19, as illustrated in FIG. 4, the known value "1" is continuously inputted to the first DES encryption circuit for title 14, and there are measured a variety of values (estimated key: Ks1m) instead of the original title key Ks1 and output values "C" of the first DES encryption circuit for title 14 with respect to these values. Then, relationships between the measured estimated keys (Ks1m) and the output values "C" are arranged on a Table 30 as shown in FIG. 5.

Similarly, a variety of estimated keys (Ks2m) are inputted to the second DES encryption circuit for title 15, and there is measured such an input value "C" that the output of the second DES encryption circuit for title 15 keeps the known value "0". Then, relationships between the measured estimated keys (Ks2m) and the input values "C" are arranged on a Table 32 as shown in FIG. 5.

In the case of comparing the thus created two Tables 30 and 32 with each other, if the same intermediate value "Clk" appears in the two Tables 30, 32, it can be recognized that the estimated keys "Ks1", "Ks2" corresponding to this value "Clk" are identical with the first and second title keys Ks1, Ks2.

Such a key decoding method (brute force key attack: meet in the middle attack ), however, requires much processing time and memory resources as well. In the case of, e.g., a 70-bit plain-text/cipher-text pair, $2^{55}$ times procedures are needed. Further, a $2^{56}$-word (64 bits per word) memory is required for creating the above Tables 30, 32. Accordingly, if an internally 16-stage DES circuit is constructed at two stages, the decoding, as a matter of fact, becomes difficult.

Incidentally, there will be explained the brute force key attack when the DES circuit is constructed at one stage by way of a comparison. There may be searched the estimated key for outputting the known output value with respect to the known input value, and, hence, the processing steps are remarkably reduced. If based on the above example, in the case of the 70-bit plain-text/cipher-text pair, a success can be attained with only the $2^{55}$ times procedures, and therefore a Wiener's apparatus that costs $100,000 is capable of decoding in approximately 35 hours.

As a result, in this embodiment, the title keys may be updated once a week or thereabouts. It is therefore possible to obviate such a problem that a communication path capacity is consumed for distributing the title keys and also to enhance a data transfer efficiency between the service provider and the service client.

Note that a necessity for performing the cipher synchronism separately from the key update secondarily arises to remarkably reduce the number of title key distributions described above. In accordance with this embodiment, the cipher synchronism is conducted based on the data identifier (ID) and the program clock reference (PCR) that are stored in the header of the transport packet for distributing the data, and it is therefore feasible to perform the cipher synchronism even when remarkably reducing the number of title key distributions. Besides, this item of program clock reference (PCR) takes a different value depending on a generation time of the transport packet. Accordingly, even when encrypting the plain text data having absolutely the same content, the data into which this item of plain text data is encrypted becomes absolutely different data.

According to the thus constructed encryption processing system of the present invention, the frequency of key changes are decreased, and the cipher synchronous signal involves the use of the time information previously provided in the transport packet. Consequently, there is eliminated the necessity for costing a part of the user packet for the sake of the enhancement of the cipher algorithm and the cipher synchronism as well.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An encryption processing system in a service provider for distributing packets each containing a header and data to a service client, said data comprising software having a plurality of titles representing the software, said header having an ID provided with each title and time information previously provided with each packet which represents data for indicating a generation time of each packet, and said system comprising:

key generating means for randomly generating first and second keys for respective titles of the software in the data;

a first encryption circuit encrypting input data with said first key;

extracting means for extracting information comprising the ID and the time information from the header of each packet and inputting the ID and the time information to said first encryption circuit as an initial value of the input data to be initially encrypted;

a second encryption circuit encrypting a value of a result of the encryption by said first encryption circuit with said second key and inputting a value of a result of this encryption to said first encryption circuit as the input data to be subsequently encrypted; and an exclusive OR circuit outputting an exclusive OR of the data stored in each packet and the value of the result of the encryption by said second encryption circuit.

2. An encryption processing system according to claim 1, wherein the packet contains storage position information about a storage position of the data stored in the packet, and said encryption processing system further comprises an encryption control circuit for enabling said first and second encryption circuits to perform the encryption only at the point in time when the data stored in the packet is inputted to said exclusive OR circuit on the basis of the storage position information.

3. An encryption processing system according to claim 1, further comprising:

initializing means for detecting time information from the packet and then initializing statuses of said first and second encryption circuits.

4. A software distributing system comprising a service provider and a service client system for distributing packets, each containing a header and software, between said service provider for providing the software and said service client and for receiving the software, said data comprising the software having a plurality of titles representing the software, said header having an ID provided with each title and time information previously provided with each packet which represents data for indicating a generation time of each packet, said service provider comprising:

key generating means for randomly generating first and second keys for respective titles of the software in the data;

key distributing means for distributing said first and second keys to said service client;

a first encryption circuit encrypting provider input data with said first key;

means for recovering the first and second keys from the key generating means;

first extracting means for extracting information comprising the ID and the time information from the header of each packet and inputting the ID and the time information to said first encryption circuit as an initial value for the provider input data to be initially encrypted;

a second encryption circuit encrypting a value of a result of the encryption by said first encryption circuit with said second key and inputting a value of a result of this encryption to said first encryption circuit as the provider input data to be subsequently encrypted;

a first exclusive OR circuit outputting an exclusive OR of the data stored in each packet and the value of the result of the encryption by said second encryption circuit; and data distributing means for distributing the packet including the header and the data output from said exclusive OR circuit to said service client, and said service client comprising:

a third encryption circuit encrypting client input data with the first key distributed by said key distributing means;

second extracting means for extracting the information including the ID from the header of each packet distributed from said service provider and inputting this information to said third encryption circuit as initial value of the client input data to be initially encrypted;

a fourth encryption circuit encrypting a value of a result of the encryption by said third encryption circuit with said second key distributed by said key distributing means and inputting a value of a result of this encryption to said third encryption circuit as the client input data to be subsequently encrypted; and a second exclusive OR circuit outputting an exclusive OR of the data stored in each packet and the value of the result of the encryption by said fourth encryption circuit.

5. An encryption processing system according to claim 4, wherein said service provider further comprises a fifth encryption circuit encrypting first and second keys with master keys having specified contents, said key distributing means distributes thus encrypted first and second keys to said service provider, and said service client further comprises a decryption circuit decrypting said encrypted first and second keys distributed by said data distributing means with said first and second keys having the specified contents.

6. An encryption processing system according to claim 1, wherein said information extracted by said extracting means comprises a program clock reference indicating a generation time of each packet.

7. An encryption processing system according to claim 4, wherein said information extracted by said first and second extracting means comprises a program clock reference indicating a generation time of each packet.

8. An encryption system distributing packets each containing a header and data said data comprising software having a plurality of titles representing the software, said header having an ID provided with each title and time information previously provided with each packet which represents data for indicating a generation time of each packet, said system comprising:

a key generating device generating a random first kev for each respective title of the software;

a first encryption circuit encrypting an input including the title of the software and a packet generation time into each respective packet, with a first key, and producing a first output, said first encryption circuit starts with an initial value and information corresponding to the title of the software and the packet generation time extracted from a header of the packet comprising the initial value of the input to said first encryption circuit;

a second encryption circuit encrypting the first output and producing a second output, the second output being supplied to said first encryption circuit as the input; and an exclusive OR circuit performing an exclusive OR operation using the packet data and the second output.

9. An encryption system for packet data, distributing packets each containing a header and data, said data comprising software having a plurality of titles representing the software, said header having an ID provided with each title and time information previously provided with each packet which represents data for indicating a generation time of each packet, said system comprising:

a key generating device generating a random first key for each respective title of the software;

a first encryption circuit encrypting an input with a first key, producing a first encrypted output, and starting with an initial value corresponding to the title of the software and the packet generation time extracted from the header of the packet;

a second encryption circuit encrypting the first encrypted output producing a second encrypted output, the second encrypted output being supplied as feedback to said first encryption circuit as the input; and an exclusive OR circuit performing an exclusive OR operation using the packet data and the second encrypted output.

10. An encryption system for packet data, distributing packets each containing a header and data, said data comprising software having a plurality of titles representing the software, said header having an ID provided with each title and time information previously provided with each packet which represents data for indicating a generation time of each packet, said system comprising:

a key generating device generating a random first key for each respective title of the software;

a first encryption circuit encrypting an input with a first key, producing a first encrypted output, and starting with an initial value corresponding to the title of the software and the packet generation time extracted from the header of the packet; and a second encryption circuit encrypting the first encrypted output producing a second encrypted output, the second encrypted output being supplied as feedback to said first encryption circuit as the input.

11. An encryption system for packet data, distributing packets each containing a header and data, said data comprising software having a plurality of titles representing the software, said header having an ID provided with each title and time information previously provided with each packet which represents data for indicating a generation time of each packet, said system comprising:

key generating means generating a random first key for each respective title of the software;

first encryption circuit means encrypting an input with a first key, producing a first encrypted output, and starting with an initial value corresponding to the title of the software and the packet generation time extracted from the header of the packet; and second encryption circuit means encrypting the first encrypted output producing a second encrypted output, the second encrypted output being supplied as feedback to said first encryption circuit as the input.

* * * * *

UNITED STATES PATENT AND TRADEMARK OFFICE
CERTIFICATE OF CORRECTION

PATENT NO. : 6,460,137 B1
DATED : October 1, 2002
INVENTOR(S) : Ryota Akiyama et al.

It is certified that error appears in the above-identified patent and that said Letters Patent is hereby corrected as shown below:

Column 8,
Line 3, after "data" (first occurrence) insert -- , --
Line 8, change "kev" to -- key --

Signed and Sealed this

Twenty-fifth Day of February, 2003

JAMES E. ROGAN
*Director of the United States Patent and Trademark Office*